W. LE R. BRYANT.
GRINDING TOOL.
APPLICATION FILED JUNE 17, 1918.
1,290,897.
Patented Jan. 14, 1919.
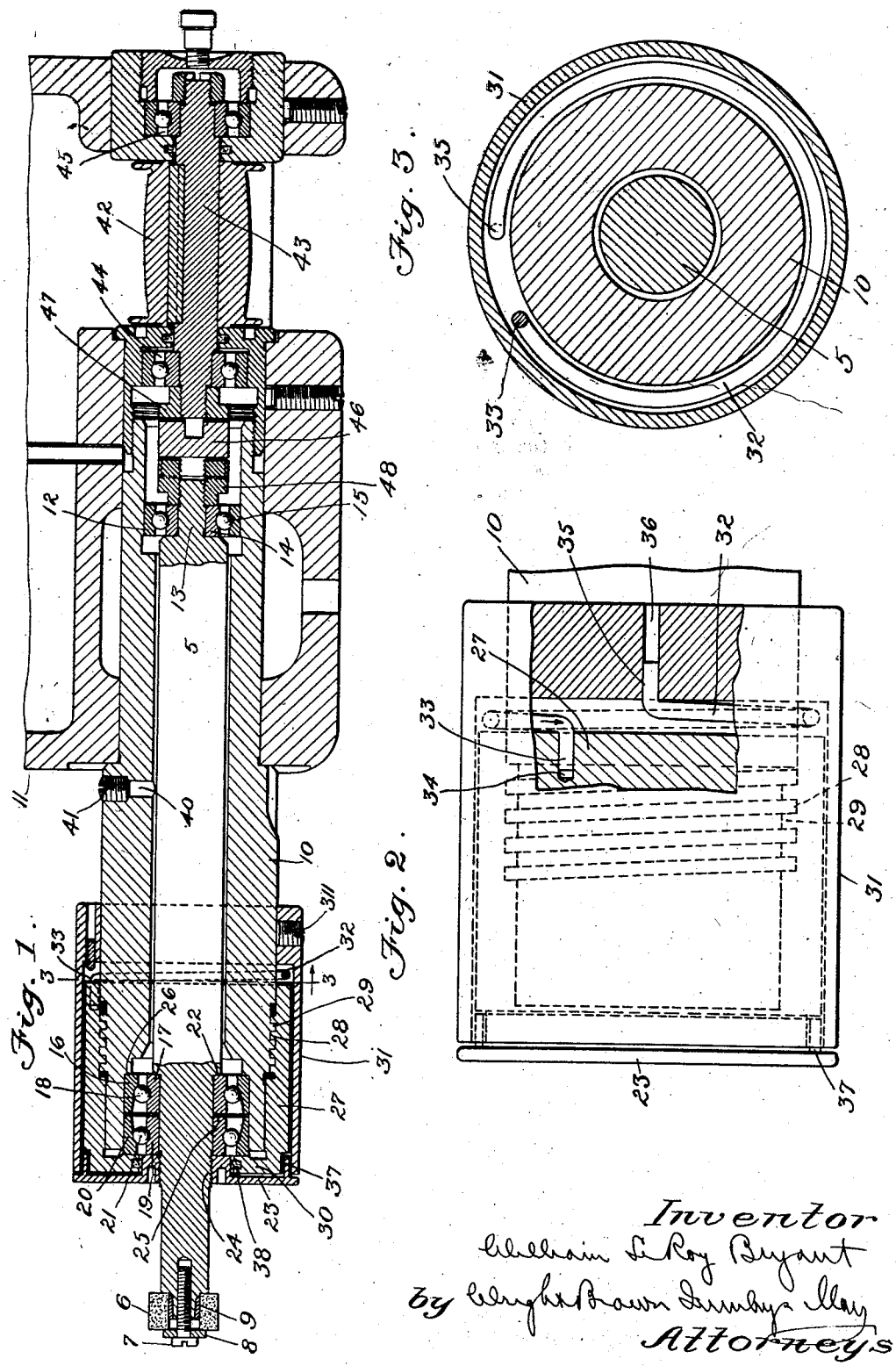

UNITED STATES PATENT OFFICE.

WILLIAM LE ROY BRYANT, OF SPRINGFIELD, VERMONT.

GRINDING-TOOL.

1,290,897.　　　　Specification of Letters Patent.　　Patented Jan. 14, 1919.

Application filed June 17, 1918.　Serial No. 240,445.

*To all whom it may concern:*

Be it known that I, WILLIAM LE ROY BRYANT, a citizen of the United States, residing at Springfield, in the county of Windsor and State of Vermont, have invented new and useful Improvements in Grinding-Tools, of which the following is a specification.

This invention has relation to grinding machines and has for its object to provide certain improvements by which the grinding wheel and its spindle may be insured against lateral vibration, and "chatter marks" on the work prevented. In accordance with the present invention, provision is made for effecting an automatic adjustment of the bearing for the spindle, to compensate for wear, thereby preventing the least looseness in the fit of the parts, such as would permit an improper yielding or vibration of the grinding wheel.

On the accompanying drawing,—

Figure 1 represents a longitudinal section through a grinding spindle and the associated parts, and illustrates one embodiment of the invention.

Fig. 2 shows the mechanism for effecting the automatic adjustment of the bearing.

Fig. 3 represents a section on the line 3—3 of Fig. 1.

The instrumentalities illustrated upon the accompanying drawing may be employed in a grinding machine of the type of that illustrated in my Letters Patent No. 1,051,483, dated January 28, 1913, to which reference may be had, the present invention relating particularly to the grinding wheel spindle and the parts associated therewith. The spindle 5 has on its reduced and tapered front end a polishing, abrading or grinding wheel 6 of the requisite diameter and shape, which is held in place by a screw 7, a washer 8, and bushing 9, of any suitable or usual construction. The spindle is located, for the most part, within a tubular body 10, supported by an arm 11 capable of movement laterally of the axis of said spindle, as described in the Letters Patent aforesaid. Within the tubular body and at the rear end thereof is a ball race 12, and on the reduced rear end 13 of the spindle is a second race 14, there being balls 15 between the races. The function of this anti-friction bearing is to hold the rear end of the spindle against lateral thrusts only. At the front end of the body there is an end thrust bearing, and also a lateral thrust bearing. The end thrust bearing comprises the races 16 and 17 and the balls 18; and the lateral thrust bearing comprises the races 19 and 20 and the balls 21; the races 16 and 20 being properly beveled and ground to perform their allotted functions. The races 17 and 19 are firmly clamped against a shoulder 22 on the spindle by the inwardly projecting hub of a disk 23 which is screwed upon a threaded portion 24 of the spindle, there being a spacer or washer 25 between said races as shown. The two races 16 and 20 are located in an enlargement of the bore of the body 10, the race 16 abutting against an internal shoulder 26.

The race 20, which flares rearwardly, is automatically adjusted rearwardly to compensate for wear on the bearing and to prevent any lateral movement of the spindle. For this purpose I employ a spring-tensioned nut which engages said race, and which is rotated yieldingly by its spring as the wear occurs. The nut is indicated at 27, and it has an internal square thread 28 so that it may be screwed upon the complementally threaded portion 29 of the body 10 as shown in Fig. 1. At its front end the nut has a flange 30 which engages the outer end of the race 20. A sleeve 31 encircles the nut, and its inner or rear end fits upon the body 10 and is affixed thereto by a set screw 311. A helical spring 32 is located in a space between the rear end of the nut and the inner end of the sleeve, one end 33 being bent and inserted in a socket 34 in the nut, and the other end 35 being bent and inserted in a socket 36 in the end of the sleeve. The stored power in the spring tends to rotate the nut in a direction to force it rearwardly of the body and hence to crowd the race 20 to the right. The pressure of the spring may be varied by rotatively adjusting the sleeve on the body and securing it in the proper position.

In order that dust and grit may be prevented from gaining access to the bearings, the disk 23 has a tubular flange 37 which fits in a recess between the front end of the sleeve 31 and the front end of the nut 27, the exterior of the latter being slightly reduced for this purpose. A gasket 38 of suitable cushioning or yielding material, held in an internal groove in the flange 30 of the nut 27, encircles and engages the hub of the disk 23. As a result of this construction, it is evident that the anti-friction bearings are amply protected from the entrance of foreign particles.

As a matter of construction, the tubular body 10 has an aperture 40, for lubricant, normally closed by a screw plug 41.

It will be understood that the spindle 5 may be rotated by any convenient mechanism. As shown, a pulley 42, driven in any suitable way, is keyed upon a spindle 43 journaled in anti-friction bearings indicated as a whole respectively at 44, 45. The pulley spindle 43 and the tool spindle 5 are substantially in alinement and are connected by a floating coupling 46 engaged with coupling members 47, 48, screwed upon the confronting ends of said spindles. Any other mechanism may be employed for rotating the tool carrier, although that shown is desirable, as it effects the rotation of the spindle without subjecting it to the lateral thrust of a driving pulley, such thrust being withstood and resisted by the anti-friction bearings 44, 45.

Referring once more to the front end of the tool or grinding spindle and the associated parts, it will be observed that they may be easily assembled. The spindle is introduced through the rear end of the body 10. The anti-friction bearings are inserted in place; the sleeve 31 is slipped on the body; the nut is screwed into place; and then, by a spanner or other suitable tool, the disk 23 is screwed on the spindle to clamp the races 17 and 19 rigidly against the shoulder 22. The sleeve 31 is now rotatively adjusted to cause the storage of power in the spring, and is then secured upon the body 10 by the set screw 311. A grinding wheel of the desired shape and size is secured on the projecting end of the spindle, to be replaced by others as circumstances require. In operation, the disk rotates rapidly with the spindle, and it and the non-rotary sleeve form an inclosing casing for the automatic nut and the anti-friction bearings.

Having thus explained the nature of my said invention and described a way of making and using the same, although without attempting to set forth all of the forms in which it may be made or all of the modes of its use, what I claim is:

1. In combination, a spindle, a relatively stationary body or support, a bearing for said spindle supported by said body, a rotatable longitudinally movable member supported by said body for adjusting said bearing to compensate for wear, and means for automatically rotating said member.

2. In combination, a spindle, a relatively stationary body or support, a bearing for said spindle supported by said body, a nut in threaded engagement with said body and exerting a longitudinal thrust against said bearing, and a spring for automatically rotating said nut.

3. In combination, a spindle, a relatively stationary body or support, a bearing for said spindle supported by said body comprising races supported by said body and said spindle respectively, and intervening balls, and automatic means for automatically adjusting one of said races in relation to the other to compensate for wear and prevent lateral movement of said spindle.

4. In combination, a spindle, an external tubular support therefor, an anti-friction bearing in said support for said spindle, including an axially movable race, and a spring-impelled nut on said support engaging said race.

5. In combination, a spindle, an external tubular support therefor, an anti-friction bearing in said support for said spindle, including an axially movable race, a nut threaded on said body and engaging said race, a member affixed upon said body, and a spring having its ends attached to said member and said nut and capable by stored power of rotating said nut to effect an axial adjustment of said race.

6. In combination, a spindle, an external tubular support therefor, a bearing in said support for said spindle including a beveled member, a nut threaded on said body and adapted to adjust said member axially, and a spring connected at one end to said nut and at its other end to said body, for automatically rotating said nut thereby effecting an axial adjustment of said bearing member.

7. In combination, a spindle, an external tubular support therefor having an external screw thread, a complementally threaded nut thereon, a rotatively adjustable member secured on said body, a spring secured to said nut and member and tending to rotate said nut, and a ball bearing for the spindle and located within said tubular body, said bearing having a race operatively connected to said nut.

8. In combination, a rotary spindle, an encircling tubular body or support therefor, a bearing for the spindle located in the support and comprising a member axially adjustable to compensate for wear, and spring-operated mechanism, encircling the body, for automatically adjusting said bearing member.

9. In combination, a grinding spindle, a grinding wheel thereon, a tubular body or support, ball bearings in said body in which said spindle is journaled, one of said bearings comprising an axially movable race, a nut threaded on said body and engaging said race, a sleeve fixed on said body and inclosing said nut, a spring connected to said sleeve and to said nut to rotate the latter, and a disk on the spindle having a flange in telescoping relation with said sleeve.

In testimony whereof I have affixed my signature.

WILLIAM LE ROY BRYANT.